(12) United States Patent
Tran

(10) Patent No.: US 11,829,187 B2
(45) Date of Patent: Nov. 28, 2023

(54) MICROPROCESSOR WITH TIME COUNTER FOR STATICALLY DISPATCHING INSTRUCTIONS

(71) Applicant: Simplex Micro, Inc., San Jose, CA (US)

(72) Inventor: Thang Minh Tran, Tustin, CA (US)

(73) Assignee: Simplex Micro, Inc., Austin, TX (US)

( * ) Notice: Subject to any disclaimer, the term of this patent is extended or adjusted under 35 U.S.C. 154(b) by 10 days.

(21) Appl. No.: 17/588,315

(22) Filed: Jan. 30, 2022

(65) Prior Publication Data

US 2023/0244490 A1 Aug. 3, 2023

(51) Int. Cl.
*G06F 9/38* (2018.01)
*G06F 9/30* (2018.01)

(52) U.S. Cl.
CPC ........ *G06F 9/3836* (2013.01); *G06F 9/30145* (2013.01)

(58) Field of Classification Search
CPC ............................ G06F 9/3836; G06F 9/30145
See application file for complete search history.

(56) References Cited

U.S. PATENT DOCUMENTS

| | | |
|---|---|---|
| 5,185,868 A | 2/1993 | Tran |
| 5,251,306 A | 10/1993 | Tran |
| 5,655,096 A | 8/1997 | Branigin |
| 5,699,536 A | 12/1997 | Hopkins et al. |
| 5,802,386 A | 9/1998 | Kahle et al. |
| 5,809,268 A | 9/1998 | Chan |
| 5,835,745 A | 11/1998 | Sager et al. |
| 5,860,018 A | 1/1999 | Panwar |
| 5,881,302 A | 3/1999 | Omata |
| 5,958,041 A | 9/1999 | Petolino, Jr. et al. |
| 5,961,630 A | 10/1999 | Zaidi et al. |
| 5,964,867 A | 10/1999 | Anderson et al. |
| 5,996,061 A | 11/1999 | Lopez-Aguado et al. |
| 5,996,064 A | 11/1999 | Zaidi et al. |
| 6,016,540 A | 1/2000 | Zaidi et al. |
| 6,035,393 A | 3/2000 | Glew et al. |
| 6,065,105 A | 5/2000 | Zaidi et al. |
| 6,247,113 B1 | 6/2001 | Jaggar |
| 6,304,955 B1 | 10/2001 | Arora |
| 6,425,090 B1 | 7/2002 | Arimilli et al. |
| 6,453,424 B1 | 9/2002 | Janniello |
| 7,069,425 B1 | 6/2006 | Takahashi |
| 7,434,032 B1 | 10/2008 | Coon et al. |
| 8,166,281 B2 | 4/2012 | Gschwind et al. |

(Continued)

FOREIGN PATENT DOCUMENTS

| | | | |
|---|---|---|---|
| EP | 0840213 A2 | 5/1998 | |
| EP | 0959575 A1 | 11/1999 | |
| WO | 0010076 A1 | 2/2000 | |

OTHER PUBLICATIONS

Written Opinion of the International Searching Authority for International application No. PCT/S2022/052185.

(Continued)

*Primary Examiner* — Zachary K Huson
(74) *Attorney, Agent, or Firm* — Appleton Luff

(57) ABSTRACT

A processor includes a time counter and provides a method for statically dispatching instructions with preset execution times based on a time count from the time counter provided to an execution pipeline.

33 Claims, 5 Drawing Sheets

(56) References Cited

U.S. PATENT DOCUMENTS

| | | |
|---|---|---|
| 9,256,428 B2 | 2/2016 | Heil et al. |
| 11,132,199 B1 | 9/2021 | Tran |
| 11,144,319 B1 | 10/2021 | Battle et al. |
| 11,163,582 B1 | 11/2021 | Tran |
| 11,204,770 B2 * | 12/2021 | Tran .................. G06F 9/3838 |
| 11,263,013 B2 | 3/2022 | Tran |
| 2003/0135712 A1 | 7/2003 | Theis |
| 2006/0095732 A1 | 5/2006 | Tran et al. |
| 2006/0218124 A1 | 9/2006 | Williamson et al. |
| 2006/0259800 A1 | 11/2006 | Maejima |
| 2006/0288194 A1 * | 12/2006 | Lewis .................. G06F 9/3869 712/220 |
| 2007/0260856 A1 | 11/2007 | Tran et al. |
| 2011/0099354 A1 | 4/2011 | Takashima et al. |
| 2013/0151816 A1 | 6/2013 | Indukuru et al. |
| 2013/0346985 A1 * | 12/2013 | Nightingale ........ G06F 15/7871 718/102 |
| 2014/0082626 A1 | 3/2014 | Busaba et al. |
| 2015/0227369 A1 | 8/2015 | Gonion |
| 2016/0092238 A1 | 3/2016 | Codrescu et al. |
| 2016/0371091 A1 | 12/2016 | Brownscheidle et al. |
| 2017/0357513 A1 | 12/2017 | Ayub et al. |
| 2018/0196678 A1 | 7/2018 | Thompto |
| 2020/0004543 A1 | 1/2020 | Kumar et al. |
| 2021/0026639 A1 | 1/2021 | Tekmen et al. |

OTHER PUBLICATIONS

Choi, W., Park, SJ., Dubois, M. (2009). Accurate Instruction Prescheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

Written Opinion of the International Searching Authority, PCT/US2023/018970.

Written Opinion of the International Searching Authority, PCT/US2023/018996.

* cited by examiner

FIG. 4A

Read Control

| Time | Reg | fwd valid |
|------|-----|-----------|
| 127  | x0  | 0 |
| 126  | x0  | 0 |
| .    | x27 | 1 |
| .    | x11 | 0 |
| 27   | x7  | 1 |
| 26   | x27 | 0 |
| 25   | x5  | 1 |
| .    | x0  | 0 |
| 2    | x0  | 0 |
| 1    | x0  | 0 |
| 0    | x0  | 0 | time count → 25

FIG. 4B

Write Control

| Time | Reg |
|------|-----|
| 127  | x0  |
| 126  | x0  |
| .    | x25 |
| .    | x14 |
| 28   | x22 |
| 27   | x9  |
| 26   | x5  |
| .    | x0  |
| 2    | x0  |
| 1    | x0  |
| 0    | x0  | time count → 26

MICROPROCESSOR WITH TIME COUNTER FOR STATICALLY DISPATCHING INSTRUCTIONS

BACKGROUND

Technical Field

The present invention relates to the field of computer processors. More particularly, it relates to issuing and executing instructions based on a time count in a processor where the processor consists of a general-purpose microprocessor, a digital-signal processor, a single instruction multiple data processor, a vector processor, a graphics processor, or other type of microprocessor which executes instructions.

Technical Background

Processors have become increasingly complex chasing small increments in performance at the expense of power consumption and semiconductor chip area. The approach in out-of-order (OOO) superscalar microprocessors has remained basically the same for the last 25-30 years, with much of the power dissipation arising from the dynamic scheduling of instructions for execution from the reservation stations or central windows. Designing an OOO superscalar microprocessor is a huge undertaking. Hundreds of instructions are issued to the execution pipeline where the data dependencies are resolved and arbitrated for execution by a large number of functional units. The result data from the functional units are again arbitrated for the write buses to write back to the register file. If the data cannot be written back to the register file, then the result data are kept in temporary registers and a complicated stalling procedure is performed for the execution pipeline.

An alternative to OOO superscalar processors is very-long-instruction-word (VLIW) processors. These have diminished interest in the industry because of the need for a complex compiler and relatively weak performance.

Thus, there is a need for an OOO superscalar microprocessor which consumes less power, has a simpler design, and is scalable with consistently high performance.

SUMMARY

The disclosed embodiments provide a processor with a time counter and a method for statically dispatching instructions to an execution pipeline with preset execution times based on a time count from the counter.

An approach to microprocessor design is static scheduling of instructions. A static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

All the above requirements are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file.

In one embodiment a time counter increments every clock cycle and the resulting count is used to statically schedule instruction execution. Instructions have known throughput and latency times, and thus can be scheduled for execution based on the time count. For example, an add instruction with throughput and latency time of 1 can be scheduled to execute when the data dependency is resolved. If the time count is 5 and the add has no data dependency at time 8, then the available read buses are scheduled to read data from the register file at time 8, the available arithmetic logic unit (ALU) is scheduled to execute the add instruction at time 9, and the available write bus is scheduled to write result data from ALU to the register file at time 9. The add instruction is dispatched to the ALU execution queue with the preset execution times. The read buses, the ALU, and the write bus are scheduled to be busy at the preset times. The maximum time count is designed to accommodate the largest future time to schedule execution of instruction. In some embodiments, the time count is 64 and no instruction can be scheduled to execute more than 64 cycles in the future. In another embodiment a superscalar microprocessor with quad-issue can have 256 instructions in the execution pipeline. With static scheduling of instructions based on the time count, the complexity of dynamic scheduling is eliminated, the arbitration of resources is reduced, and the hundreds of comparators for data dependency are eliminated. The basic out-of-order execution of instructions is the same, but statically scheduling of instructions with a time count is more efficient. The elimination of the extra components means the processor consumes less power. Instructions are efficiently executed out-of-order with preset times to retain the performance compared to traditional dynamic approaches. The number of issued instructions is scalable from scalar to superscalar.

In one embodiment a processor includes a time counter which stores a time count incremented every clock cycle representing a current time of the processor, an instruction issue unit for receiving a first instruction and issuing the first instruction with a preset execution time based on the time count, and an execution queue for receiving the first instruction from the instruction unit and dispatching the first instruction to a functional unit when the preset execution time is the same as the time count.

BRIEF DESCRIPTION OF THE DRAWINGS

Aspects of the present invention are best understood from the following description when read with the accompanying figures.

FIGS. 4A and 4B are block diagrams illustrating a read bus control and a write bus control operation.

DETAILED DESCRIPTION

Figure 1:
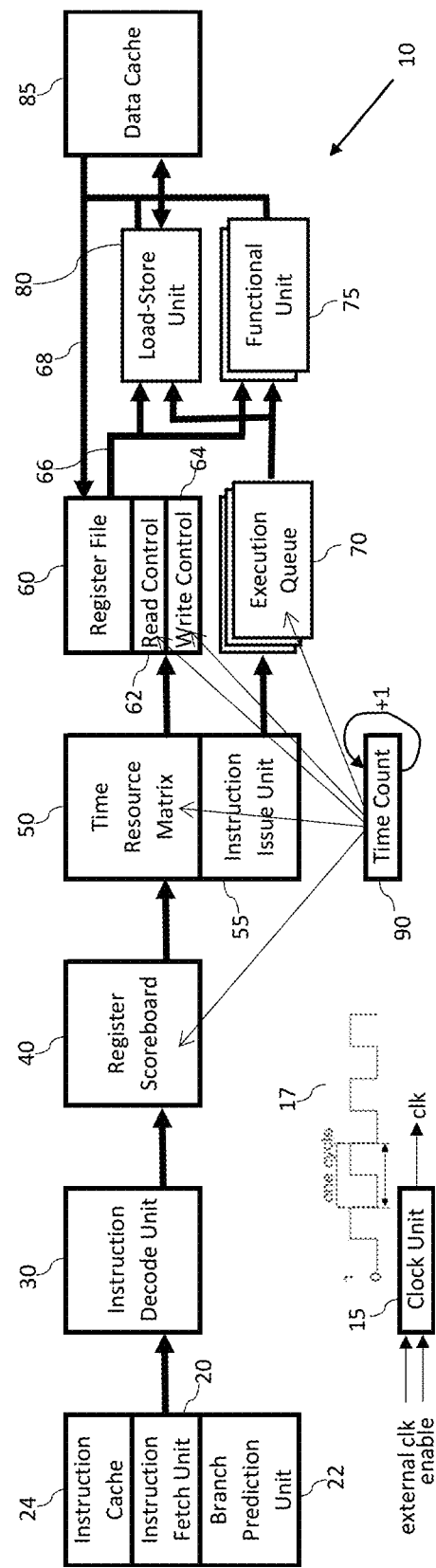
FIG. 1 is a block diagram illustrating a processor based data processing system in accordance with present invention.

The following description provides different embodiments for implementing aspects of the present invention.

Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 3 (based on a data cache hit), and the divide instruction have throughput and latency times of 32.

FIG. 1 is a block diagram of a microprocessor based data processing system. The exemplary system includes a microprocessor 10 having a clock unit 15, an instruction fetch unit 20, an instruction cache 24, a branch prediction unit 22, an instruction decode unit 30, a register scoreboard 40, a time-resource matrix 50, an instruction issue unit 55, a register file 60, a read control unit 62, a write control unit 64, a plurality of execution queues 70, a plurality of functional units 75, a load-store unit 80, and a data cache 85. The microprocessor 10 includes a plurality of read buses 66 from the register files to the functional units 75 and load-store unit 80. The system also includes a plurality of write buses 68 to write result data from the functional unit 75, the load-store unit 80, and the data cache 85 to the register file 60. The microprocessor 10 is a synchronous microprocessor where the clock unit generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 provide a handy to synchronize many different units and states in the microprocessor 10. The clock signal is used to sequence data and instructions through the units that perform the various computations in the microprocessor 10. The clock unit 15 may include an external clock as input to synchronize the microprocessor 10 with external units (not shown). The clock unit 15 may further include an enable signal to disable the clock unit when the microprocessor is in idle stage or not use for instruction execution.

According to an embodiment the microprocessor 10 also includes a time counter unit 90 which stores a time count incremented, in one embodiment, every clock cycle. The time counter unit 90 is coupled to the clock unit 15 and uses "clk" signal to increment the time count.

In one embodiment the time count represents the time in clock cycles when an instruction in the instruction issue unit 55 is scheduled for execution. For example, if the current time count is 5 and an instruction is scheduled to be execute in 22 cycles, then the instruction is sent to the execution queue 70 with the execution time count of 27. When the time count increments to 26, the execution queue 70 issues the instruction to the functional unit 75 for execution in next cycle (time count 27). The time counter unit 90 is coupled to the register scoreboard 40, the time-resource matrix 50, the read control 62, the write control 64, and the plurality of execution queues 70. The scoreboard 40 resolves data dependencies in the instructions. The time-resource matrix 50 checks availability of the various resources which in one embodiment include the read buses 66, the functional units 75, the load-store unit 80, and the write buses 68. The read control unit 62, the write control unit 64, and the execution queues 70 receive the scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time. The execution queue 70 is set to dispatch an instruction to a functional unit 75 or the load-store unit 80 at a preset time. In each case, the preset is the time setup by the decode/issue unit. The preset time is future time based on the time count, so when the time count is counts up to the preset time, then the specified action will happen, where the specified action is reading data from the register file, writing data to the register file, or issuing instruction to a functional unit for execution. The decode/issue unit 30 determines that the instruction is free of data dependency and the resource is available to set the "preset time" for the instruction to be executed in the execution pipeline.

In the microprocessor system 10 the instruction fetch unit 20 fetches the next instruction(s) from the instruction cache 24 to send to the instruction decode unit 30. One or more instructions can be fetched per clock cycle from the instruction fetch unit depending on the configuration of microprocessor 10. For higher performance, microprocessor 10 fetches more instructions per clock cycle for the instruction decode unit 30. For low-power and embedded applications, microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical of memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit is also coupled with the branch prediction unit 22 for prediction of the next instruction address when the branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 for new instructions and also coupled to the register scoreboard 40. The instruction decode unit 30 decodes the instructions for instruction type, instruction throughput and latency times, and the register operands. The register operands, as an example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution. The register scoreboard 40 is used to keep track of the completion time of the destination registers of the earlier instructions. In the preferred embodiment the completion time is maintained in reference to the time count 90.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries read and written as with a conventional register structure.

Figure 2:
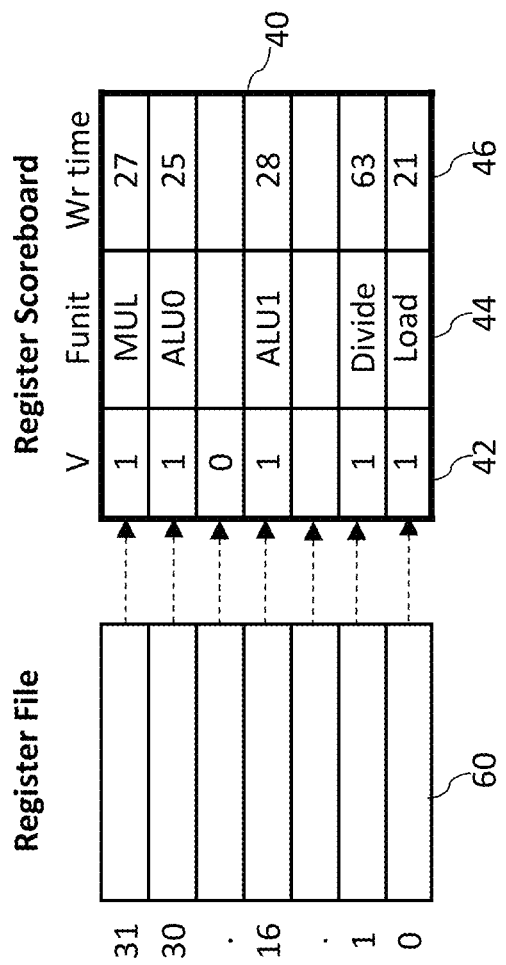
FIG. 2 is a block diagram illustrating a register file and a register scoreboard.

FIG. 2 illustrates the register file 60 and the register scoreboard 40. In one embodiment, the register file 60 has 32 registers, numbered as registers 0 to 31 as illustrated. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44. As examples illustrated in FIG. 2, register 0 is written back at time count 21 from the load-store unit 80. Register 1 is written back at time count 63 from the divide unit (one of the functional units 75). Register 16 is written back at time count 28 from the ALU1, (another of the functional units 75), etc. as illustrated in FIG. 2. The write time 46 is the time in reference to the time count 90. The result data is written to the register file 60. The data is not available from the register file 60 until the next clock cycle, but the result data can be forwarded from the functional unit 44 in the register scoreboard 40. For example, if the value of the time count 90 is 19, then the load-store unit 80 produces the result data in 2 clock cycles for writing back to the register file 60.

The write time of a destination register is the read time for the subsequent instruction with RAW data dependency on the same destination register. Referring back to FIG. 1, the source registers of an instruction in the instruction decode unit 30 access the register scoreboard 40 for the read times. If the valid bit 42 of a source register is not set in the register scoreboard 40, then the data in the register file 60 and can be accessed at any time providing availability of the read buses 66, otherwise the write time 46 is the earliest time to issue the instruction.

An instruction reads source operand data at read time, executes the instruction with a functional unit 75 at execute time, and writes the result data back to the register file 60 at write time. The write time is recorded in the write time field 46 of the register scoreboard 40. With 2 source registers, the instruction selects the later write time from the register scoreboard 40 as the read time for the instruction. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 3 assuming a data cache hit. In another example, if the current time count is 5 and the source registers of an add instruction receive write time counts of 22 and 24 from the register scoreboard 40, then the read time count is set at 24. In this case, the execution and the write time counts are both 25 for the add instruction. As shown in FIG. 1, the register scoreboard 40 is coupled to the time-resource matrix 50 where the read, execute, and write times of an instruction access the time-resource matrix 50 for availabilities of the resources.

Figure 3:
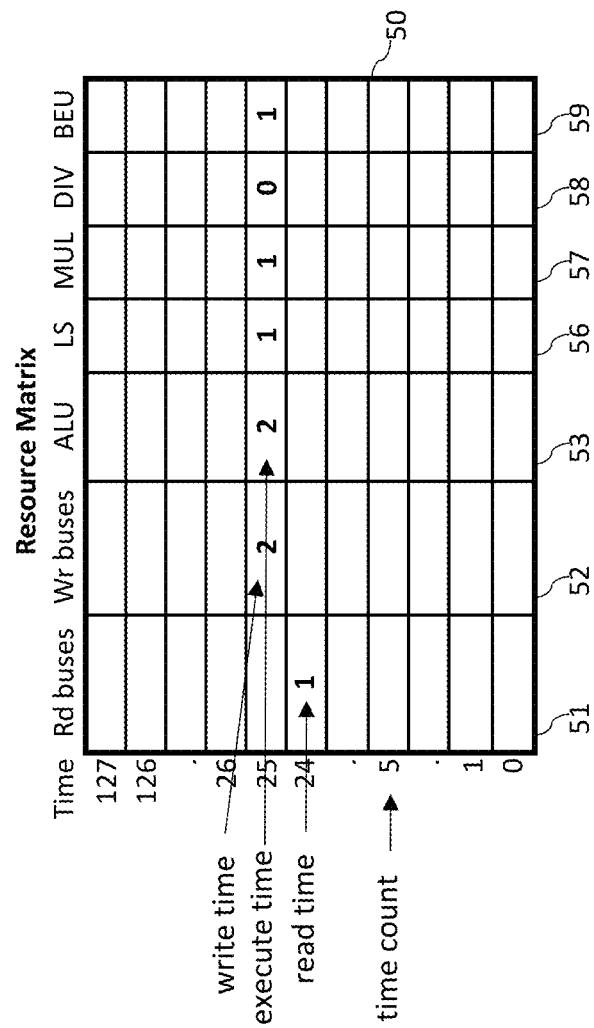
FIG. 3 is a block diagram illustrating a time-resource matrix.

FIG. 3 illustrates the time-resource matrix 50. The time-resource matrix 50 preferably includes the same number of time entries to match the time counter 90. For example, if the time counter 90 is 128 cycles, then the time-resource matrix 50 has 128 entries. The time counter is incremented every clock cycle and rotates back from the 127th entry to the 0th entry. The columns in the time-resource matrix 50 represent the available resources for the read buses 51, the write buses 52, the ALUs 53, the load-store ports 56, the multiply unit 57, the divide unit 58, and the branch execution unit (BEU) 59. If other functional units are provided by microprocessor 10 those are also included in the resource matrix 50.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. The load-port ports column 56 corresponds to the load-store unit 80 of FIG. 1.

FIG. 3 also shows an example of the information in the time-resource matrix 50. Shown is data with a read time count of 24, an execution time count of 25, and a write time count of 25. When an instruction accesses the time-resource matrix 50 for availability of resources, the matrix 50 shows that at read time 24, there is 1 available read bus, and at execution time 25, there are 2 available ALUs, 1 load-store port, 1 multiply unit, and 1 BEU for execution of instruction. At write time 25, there are 2 available write buses.

All available resources for the required times are read from the time-resource matrix 50 and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to reduce the available resource values. All resources must be available at the required time counts for the instruction to be dispatched to the execution queue 70. If all resources are not available, then the required time counts are incremented by one, and the time-resource matrix is checked as soon as the same cycle or next cycle. The particular number of read buses 66, write buses 68, and functional units 75 in FIG. 1 is preferably chosen to minimize stalling of instruction in the instruction issue unit 55.

FIG. 4A illustrates a single read bus of the read control unit 62 and FIG. 4B a single write bus of the write control unit 64. The read control unit 62 and the write control unit 64 include a number of time entries to match the time counter 90. As mentioned above, in a preferred embodiment the time count is incremented every clock cycle. The columns in the read control unit 62 represent the source register 61 and a forwarding valid bit register 63. The column in the write control unit 64 represents the destination registers in the write bus 65. In one embodiment, microprocessor 10 uses the RISC-V instruction set architecture. In that architecture register 0 (x0) is not a real register; reading of register x0 returns 0 and writing to register x0 is ignored.

The x0 register is used as an invalid read and write to the register file 60. If a different instruction set architecture is used, then the read control unit 62 and the write control unit 64 include another column of valid bits (not shown) to indicate a valid read or write, respectively.

In the example illustrated in FIGS. 4A and 4B, at the time count of 25 the forward valid bit 63 of the read control unit 62 is set "on" and the data will be forwarded from a functional unit, not from the register file 60. The register x5 from the register field 61 of the read control 62 is used to read the entry 5 from the register scoreboard 40 for the "Funit" 44 which is used for forwarding. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from the hundreds of instructions in dynamic scheduling. Similarly in FIG. 4B, the register x5 from the register field 65 of the write control unit 64 at time count of 26 is used to write to the register file 60. The register x5 will also access the "Funit" 44 of the register scoreboard 40 to get the result data from a specific functional unit 75. Again, the execution queues 70 the functional units 75, and the write control unit 64 are synchronized to transfer result data on a write bus 68 to write to the register file 60. The write control unit 64 is the centralized control for the write buses 68 which removes complexity compared to the plurality of functional units in dynamic scheduling.

Figure 5:
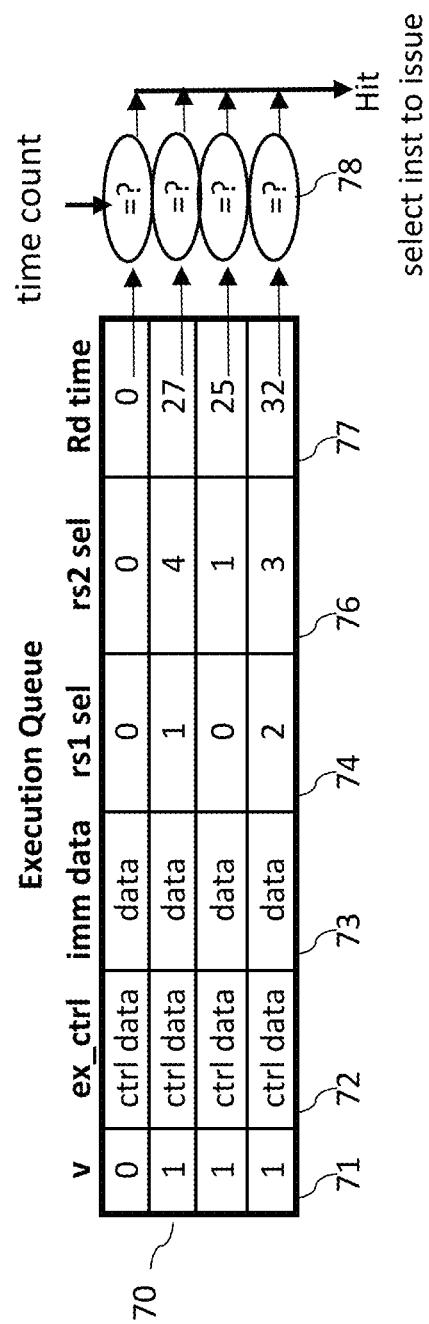
FIG. 5 is a block diagram illustrating an execution queue.

FIG. 5 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units 75 or the load/store unit 80 according to the time count in the read time column 77. Each entry in the execution queue 70 preferably consists of the following fields: the valid bit 71, control data 72, the immediate data 73, the first source register select 74, the second source register select 76, and the read time 77. The valid bit 71 indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74 and 76 may not be used for some instructions.

Note that the destination register can be but does not need to be kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62.

When the read time 77 is the same as the time count 90 as detected by the comparators 78, the instruction is issued to the functional units 75 or the load/store unit 80. For the example in FIG. 5, the entries are issued to the functional units out-of-order. The read time field 77 indicates that the second entry is issued at time count 25, the third entry is issued at time count 27, and the first entry is issued at time count 32.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. Furthermore, the invention is not limited to integer functional units. In other embodiments the functional units include floating point units, digital-signal processing units, vector processing units, or custom designed units.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor comprising:
   a time counter storing a time count representing a current time of the processor, wherein the time count is incremented with each clock cycle of a clock circuit;
   an instruction issue unit coupled to the time counter for receiving a first instruction, and issuing the first instruction with a preset execution time based on the time count; and an execution queue coupled to the time counter and the instruction issue unit to receive the first instruction from the instruction issue unit, and dispatch the first instruction to a functional unit when the preset execution time is correlated to the time count.

2. The processor of claim 1 wherein:
the time counter comprises an N-bit counter which counts from a zero count to an Nth-bit count value, which represents a largest future time for the instruction issue unit to issue an instruction; wherein
the N-bit counter returns to the zero count after reaching the Nth-bit count value.

3. The processor of claim 2 further comprising a register scoreboard storing a write time of a selected register from a plurality of registers in a register file, wherein the write time is a future time based on the time count.

4. The processor of claim 3 further comprising:
an instruction decode unit coupled to the register scoreboard
the instruction decode unit reading a write time for each source operand of the first instruction from the register scoreboard, and using the one or more write times corresponding to the first instruction to determine an execution time for the first instruction.

5. The processor of claim 4 further comprising a time-resource matrix unit coupled to the register scoreboard and the time counter for storing information relating to available resources for each time count of the N-bit time counter, and wherein the available resources include at least one of: a plurality of read buses, a plurality of write buses, and a plurality of functional units.

6. The processor of claim 5 wherein the instruction issue unit is coupled to the time resource matrix unit to receive data therefrom to issue an instruction if all the resources from the time-resource matrix are available, and to stall the instruction if any of the resources is not available.

7. The processor of claim 3 further comprising a read control unit that stores, for each time count, an identifier for a source register of a register file and a forwarding valid bit the time count indicative of when the corresponding source register may be read and transported on a read bus.

8. The processor of claim 7 further comprising a write control unit that stores, for each time count, an identifier for a destination register of the register file the time count indicative of when result data are transported from a write bus and written to the destination register of the register file.

9. The processor of claim 8 wherein the execution queue stores a plurality of instructions wherein each instruction includes a read time which is a future time based on the time count.

10. The processor of claim 9 further comprising a read bus control unit that is synchronized with each read time stored in the execution queue.

11. The processor of claim 8 wherein the execution queue dispatches instructions to at least one functional unit.

12. A processor comprising:
a clock circuit;
a time counter storing a time count representing a current time of the processor, wherein the time count is incremented with each cycle of the clock circuit;
an instruction issue unit coupled to the time counter for receiving a first instruction, and issuing the first instruction with a preset execution time based on the time count;
an execution queue coupled to the time counter and the instruction issue unit to receive the first instruction from the instruction issue unit, and dispatch the first instruction to a functional unit when the preset execution time is correlated to the time count;
a register scoreboard storing a write time of a selected register from a plurality of registers in a register file, wherein the write time is a future time based on the time count;
an instruction decode unit coupled to the register scoreboard, the instruction decode unit reading a write time for each source operand of the first instruction from the register scoreboard, and using the write times corresponding to the first instruction to determine an execution time for the first instruction;
a time-resource matrix coupled to the register scoreboard and the time counter for storing information relating to available resources for each time count of the time counter and
wherein the available resources include at least one of: a plurality of read buses, a plurality of write buses, and a plurality of functional units.

13. A method executed by a processor comprising:
issuing an instruction to an execution queue in the processor; and
executing the instruction at a future time wherein the future time is a time based on a time count from a time counter which is incremented with each clock cycle of a clock circuit.

14. The method of claim 13 wherein the time counter provides a maximum time count corresponding to a latest future time to issue the instruction.

15. The method of claim 14 further comprising storing the write time of a first register of a register file wherein the write time is a future time based on the time count.

16. The method of claim 15 further comprising storing information corresponding to available resources for each time count in a time-resource matrix, wherein the resources comprise at least one of a plurality of read buses, a plurality of write buses, and a plurality of functional units.

17. The method of claim 16 further comprising storing an identifier corresponding to a second register of the register file in a read control unit, the read control unit causing the second register to be read from the register file and transported on a read bus.

18. The method of claim 17 further comprising storing an identifier corresponding to a third register of the register file in a write control unit, the write control unit causing result data to be transported from a write bus and written to the third register of the register file.

19. The method of claim 13 further comprising storing a plurality of instructions in an execution queue wherein each instruction includes a read time based on the time count.

20. The method of claim 19 further comprising synchronizing the read time of each instruction stored in the execution queue with a read control unit that controls reading of data by way of a read bus.

21. The method of claim 17, wherein the execution queue is configured to dispatch instruction to a single functional unit or multiple functional units.

22. The method of claim 13, further comprising: executing the instruction at the future time when a plurality of resources accessible by the processor are available.

23. A processor comprising:
a time counter storing a time count representing a current time of the processor, wherein the time count is incremented with each clock cycle of a clock circuit;
an instruction issue unit coupled to the time counter for receiving a first instruction, wherein the first instruction requires a plurality of resources to be available for execution, the instruction issue unit issuing the first instruction with a preset execution time at a time count at which the plurality of resources for execution of the first instruction are available; and an execution queue coupled to the time counter and the instruction issue unit to receive the first instruction from the instruction issue unit, and dispatch the first instruction to a functional unit when the preset execution time is correlated to a value of the time count.

24. The processor of claim 23 wherein:

the time counter comprises an N-bit counter which counts from a zero count to an Nth-bit count value, which represents a largest future time for the instruction issue unit to issue an instruction; wherein the N-bit counter returns to the zero count after reaching the Nth-bit count value.

25. The processor of claim 24 further comprising a register scoreboard storing a write time of a selected register from a plurality of registers in a register file, wherein the write time is a future time based on the time count.

26. The processor of claim 25 further comprising:

an instruction decode unit coupled to the register scoreboard;

the instruction decode unit reading a write time for each source operand of the first instruction from the register scoreboard, and using the one or more write times corresponding to the first instruction to determine an execution time for the first instruction.

27. The processor of claim 26 further comprising a time-resource matrix unit coupled to the register scoreboard and the time counter for storing information relating to available resources for each time count of the N-bit counter, and wherein the available resources include at least one of: a plurality of read buses, a plurality of write buses, and a plurality of functional units.

28. The processor of claim 27 wherein the instruction issue unit is coupled to the time resource matrix unit to receive data therefrom to issue an instruction if all the resources from the time-resource matrix are available, and to stall the instruction if any of the resources is not available.

29. The processor of claim 28 further comprising a read control unit that stores, for each time count, an identifier for a source register of a register file-and a forwarding valid bit the time count indicative of when the corresponding source register may be read and transported on a read bus.

30. The processor of claim 29 further comprising a write control unit that stores, for each time count, an identifier for a destination register of the register file, the time count indicative of when result data are transported from a write bus and written to the destination register of the register file.

31. The processor of claim 30 wherein the execution queue stores a plurality of instructions wherein each instruction includes a read time which is a future time based on the time count.

32. The processor of claim 31 further comprising a read bus control unit that is synchronized with each read time stored in the execution queue.

33. The processor of claim 32 wherein the execution queue dispatches instructions to at least one functional unit.

* * * * *